W. DALLAS.
CUTTER CLEARANCE GAGE.
APPLICATION FILED APR. 17, 1919.
1,340,022.                              Patented May 11, 1920.
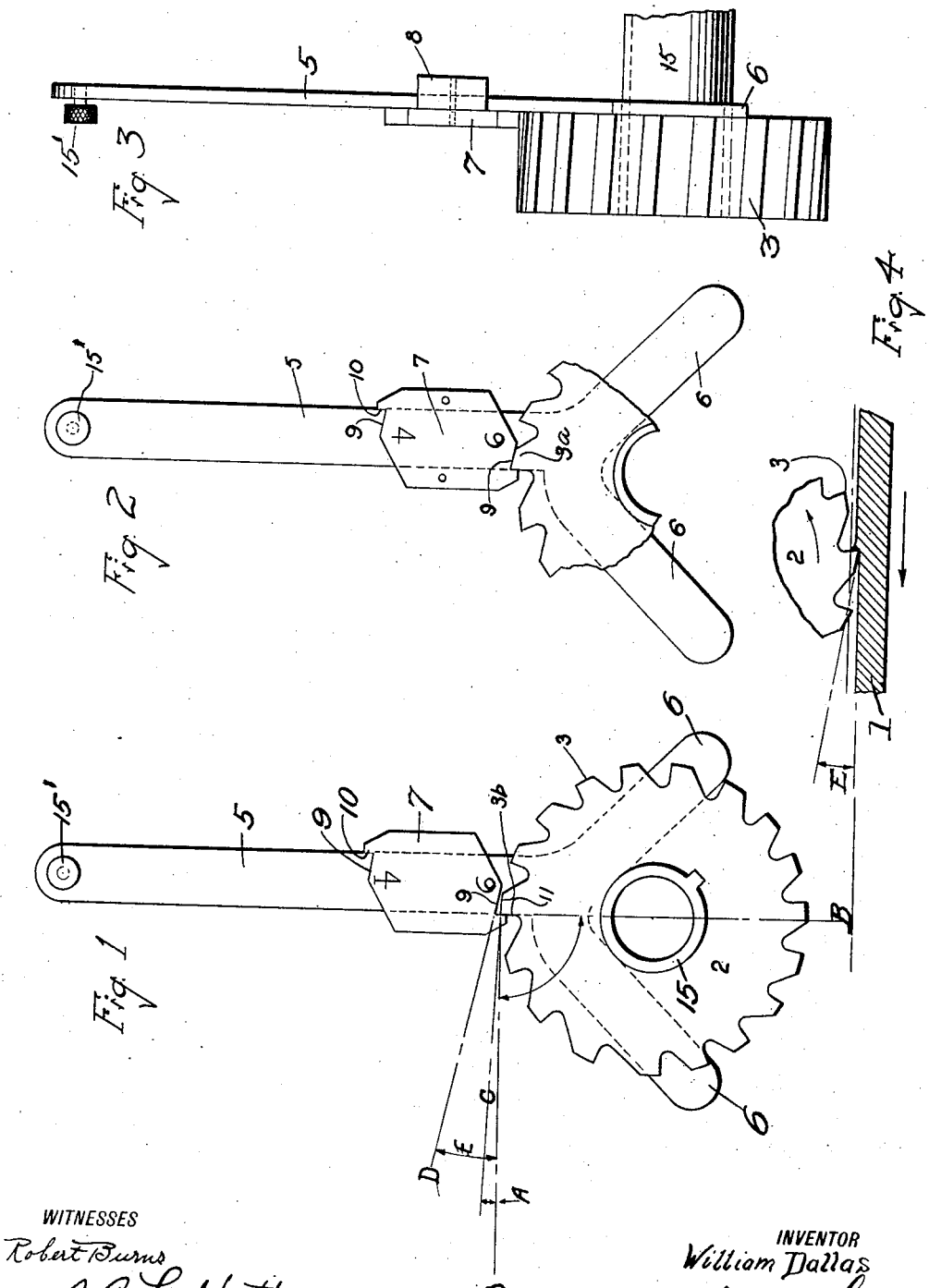
WITNESSES
Robert Burns
J. C. Ledbetter
INVENTOR
William Dallas
BY
ATTORNEYS

UNITED STATES PATENT OFFICE.

WILLIAM DALLAS, OF PHILADELPHIA, PENNSYLVANIA.

CUTTER-CLEARANCE GAGE.

1,340,022.  Specification of Letters Patent.  Patented May 11, 1920.

Application filed April 17, 1919. Serial No. 290,683.

*To all whom it may concern:*

Be it known that I, WILLIAM DALLAS, a citizen of the United States, a resident of Philadelphia, county of Philadelphia, and State of Pennsylvania, have invented a new and Improved Cutter-Clearance Gage, of which the following is a full, clear, and exact description.

This invention relates to cutter clearance gages. In particular the invention relates to a precision measurement gage for indicating the proper clearance angle to be ground upon the cutting tooth of a milling cutter tool.

Broadly speaking, an object of my invention is to provide a simple form of cutter clearance gage which may be applied to the tooth of the milling cutter for testing the ground angle of the tooth without removing said cutter from the mandrel of a grinding machine.

An object of my invention is to provide an angle indicating means suitably arranged on a handle and a centering means for locating the gage on a mandrel in position with the cutter tool to be tested.

Finally, it is an object of my invention to provide a precision measurement gage of the type above described which will be comparatively inexpensive to manufacture and sell and which will comprise a minimum number of parts.

Referring now more in particular to the drawings illustrating my invention, Figures 1 and 2 illustrate the cutter clearance gage in measurement application with a tool to be tested.

Fig. 3 illustrates a side view of the gage applied to a cutter tool, the teeth of which are to be tested.

Fig. 4 illustrates the cutting action of a tooth milling or cutting through a bar of iron or other material.

A gage made in accordance with my invention consists of a handle with a centering fork. A slide is confined on the handle, and the slide has an angle clearance test face. When the gage is applied to a milling cutter tool, the test face displays at a glance whether or not the cutting teeth have the correct clearance angle.

In the drawings I have employed Fig. 4 in order to more thoroughly explain what is meant by clearance of a cutter tooth of a milling cutter tool.

The mass of material 1 to be milled or cut is passed, in the direction of the arrow, past the cutter tool 2, with said tool rotating. It is very necessary to so grind and shape the face 3 of a milling cutter tooth that it will have the correct angle "E" between the working face and the plane of the material 1 to be cut. This angle E is known as the clearance angle, and when a milling cutter tooth is properly ground the rear portion of the tooth will not come in contact with the mass to be cut. In case the rear portion or working face 3 does rub in contact with the material the cutting action will be imperfect causing injury to the delicate cutter and to the finished surface of the material undergoing the milling process.

When the cutter tool 2 becomes dull and worn it is the practice of a mechanic to remove the cutter from its mountings on the milling machine and place it in a grinding machine where the working face 3 of the teeth are ground. During this grinding and refinishing process of each individual tooth of the cutter tool it is necessary to test regularly and often the cutter clearance angle E of the tooth.

My invention comprises means for quickly and accurately carrying out this test measurement, and embodies a smoothly finished hard steel bar handle 5 provided with integrally formed outwardly-turned arms, or center fork 6 formed on one end of the handle. An indicating gage 7 is pinned or otherwise fixed to a slide retainer 8. This device is slidably confined upon the handle 5 being closely and accurately fitted to prevent undue and irregular motion of the slide upon the handle. The indicating gage or plate 7 is provided with test faces 9 cut in the upper and lower edge of the plate. Contact faces 10 are cut in the plate adjacent to the test faces 9. The angular relation of the test face and contact face provides an engaging surface adapted to receive the working portion of the milling or cutter tooth.

In use the clearance gage will be applied to the milling tool as illustrated in the figures, with the fork 6 located in contact with the grinding mandrel 15 and the handle 5 ranged vertically adjacent the radial face of the milling tool, and with the indicating gage brought downwardly into engagement with the tooth until the contact face 10 touches the radial face of the tooth of the milling cutter whereupon the test face 9 provides a reference line for indicating either the error or correctness of the tooth formation.

The Fig. 2 shows the application of this cutter clearance gage to a tooth 3ª which is properly ground, and shows the contact face and test face of the gage plate in perfect contact with the work face and radial face of the tooth 3ª. When the mechanic applies the cutter clearance gage as aforesaid and gets a reading as illustrated in Fig. 2 he will then know that the tooth is properly ground and he will pass on and take up the grinding and correction of the next dull tooth.

The Fig. 1 illustrates the application of my cutter clearance gage to a dull, or inaccurately ground, milling cutter tooth. The contact face 10 of the gage plate is brought into engagement with the radial face 11 of the worn tooth 3ª, and it is noted that the test face 9 of the gage plate will not contact the work face of the cutter tooth. The mechanic will, therefore, know that this tooth is dull and improperly ground and will not give good service. It is a matter of grinding and refinishing the cutter tool shown in Fig. 1 until it will show up favorably under precision test of cutter clearance angle illustrated in Fig. 2.

Referring further to Fig. 1 the diagram line B is erected as a base line right-angular to the vertical V for calculating the proper angle which the work face of the tooth should have with said base line B. The test line C is erected on the diagram extending coincident with the plane forming the old and worn work face 3ᵇ of the tooth. The angle A included between the lines B and C is, therefore, an incorrect angle for the tooth. A test line D is erected on the diagram extending coincident with the test face 9 of the gage plate thus generating the angle E formed between the lines B and D. This angle E is the correct angle to which the cutter tooth should be ground, and is so indicated by the test face 9 of this cutter clearance gage.

This design of cutter clearance gage may be applied to the milling cutter tool without removing said tool from the grinding machine since its application does not require the introduction of any parts or fixtures into the bore of the milling cutter, but merely requires the mechanic to place the centering fork 6 on the mandrel which centers the instrument for observing the test slide applied to the working face of a tooth.

I have illustrated an indicating gage plate provided with two sets of test faces. One set being shown in engaging relation with the tooth, while the other set of test faces is formed on the upper end of the indicating gage plate. One set is graduated by the number 6 which will indicate that this test face of the gage is adapted to read off 6 degrees thereby informing the mechanic that he is working with a 6 degree clearance angle. If he desires to use a 4 degree measurement he will reverse the slide upon the handle by removing a screw 15′ which is screw-threaded into the handle. The 4 degree and 6 degree marks are shown, but any appropriate degree angle test face instrument can be built under the present disclosure.

This form of precision gage will have a broad range of uses in and about factories requiring facilities for speeding up production and improving manufacturing operations.

Having thus described my invention, what I claim as new, and desire to secure by Letters Patent is:

1. In a cutter clearance gage for testing the cutting faces of milling cutter tools, the combination with a handle member, receptive means formed integral with the handle for centering the gage upon a mandrel, a slide disposed upon the handle, and having a cutter tooth test face formed in the slide adapted to indicate the proper angle of the milling cutter tooth.

2. A cutter clearance gage capable of application to and removal from a milling cutter tool, a handle, forked arms formed on the handle and adapted to contact the diametrical face of a mandrel adapted to support a milling cutter tool, an indicating gage plate slidably retained upon the handle and provided with test faces to show whether or not the clearance angle of the milling cutter teeth are correctly ground.

3. In a cutter clearance gage for indicating the desirable clearance angle of a tooth of a milling cutter tool, the combination with a handle capable of application to a mandrel, an indicating gage plate slidably retained upon the handle, and two sets of test faces formed in the indicating gage plate such that one set may be used for a certain size milling cutter and the other set of test faces be used for some other size of milling cutter tool.

4. A cutter clearance gage for indicating the proper clearance angle on the teeth of milling cutters, comprising: a bar, a centering fork integral with the bar, a slide on the bar, said slide provided with an angular test face adapted to rest against one of the cutter teeth for indicating proper clearance angle of milling cutter teeth.

WILLIAM DALLAS.